US008458875B2

(12) United States Patent
Dalrymple

(10) Patent No.: US 8,458,875 B2
(45) Date of Patent: Jun. 11, 2013

(54) DIESEL FUEL INJECTOR CIRCLIP AND FERRULE RING REMOVING TOOL

(75) Inventor: Joshua Kyle Dalrymple, Columbia, SC (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 414 days.

(21) Appl. No.: 12/915,318

(22) Filed: Oct. 29, 2010

(65) Prior Publication Data

US 2011/0265302 A1 Nov. 3, 2011

Related U.S. Application Data

(60) Provisional application No. 61/312,189, filed on Mar. 9, 2010.

(51) Int. Cl.

| | |
|---|---|
| ***B25B 27/14*** | (2006.01) |
| ***B23P 19/04*** | (2006.01) |
| ***B23P 19/08*** | (2006.01) |
| ***B23P 19/02*** | (2006.01) |
| ***B23P 19/00*** | (2006.01) |
| *B25B 13/00* | (2006.01) |

(52) U.S. Cl.
USPC .................. 29/235; 29/280; 29/225; 29/229; 29/426.1; 29/426.5; 29/426.6; 29/253; 29/255; 29/266; 81/90.3; 81/453

(58) Field of Classification Search
USPC .................. 29/225, 229, 235, 280, 282, 267, 29/278, 426.1, 426.5, 426.6, 252, 253, 254, 29/255, 263; 254/19, 18; 81/64, 90.3, 92, 81/97, 453
See application file for complete search history.

(56) References Cited

U.S. PATENT DOCUMENTS

| | | | | |
|---|---|---|---|---|
| 1,536,319 | A * | 5/1925 | Yost | 7/158 |
| 3,067,502 | A * | 12/1962 | Wheatley et al. | 29/255 |
| 3,808,590 | A * | 4/1974 | Hemmer et al. | 439/692 |
| 4,277,872 | A * | 7/1981 | Lewis | 29/229 |
| 4,291,451 | A * | 9/1981 | O'Neill et al. | 29/235 |
| 4,776,245 | A * | 10/1988 | Gustavsson | 81/302 |
| 5,062,191 | A * | 11/1991 | Carr | 29/229 |
| 5,090,102 | A * | 2/1992 | Lovell | 29/255 |
| 5,127,145 | A * | 7/1992 | Ross | 29/402.02 |
| 5,174,177 | A * | 12/1992 | Jeromson et al. | 81/486 |
| 5,722,141 | A * | 3/1998 | Strickland | 29/267 |
| 6,158,099 | A * | 12/2000 | Skrzypek | 29/255 |
| 6,334,429 | B1 * | 1/2002 | Little, Jr. | 123/320 |
| 6,718,607 | B1 * | 4/2004 | Gillet et al. | 29/229 |
| 6,792,658 | B2 * | 9/2004 | Capoferi et al. | 29/255 |
| 6,993,816 | B2 * | 2/2006 | Greenhill | 29/229 |
| 7,007,357 | B2 * | 3/2006 | Nakamoto | 29/229 |
| 7,048,266 | B2 * | 5/2006 | Starr | 269/25 |

(Continued)

FOREIGN PATENT DOCUMENTS

DE 19725597 A1 * 10/1998

*Primary Examiner* — Essama Omgba
*Assistant Examiner* — Darrell C Ford
(74) *Attorney, Agent, or Firm* — Mark C. Bach; Jeffrey P. Calfa

(57) ABSTRACT

A removal tool includes a staking unit configured to deform a circlip located at a bore of an apparatus when the removal tool is pushed into the bore, and a spring fork unit configured to push a ferrule ring located at the bore when the removal tool is pushed into the bore.

15 Claims, 2 Drawing Sheets

U.S. PATENT DOCUMENTS

| | | | | |
|---|---|---|---|---|
| 7,055,413 | B1 * | 6/2006 | Wang | 81/302 |
| 7,118,403 | B1 | 10/2006 | Drye | |
| 7,257,888 | B2 * | 8/2007 | Nelson et al. | 29/764 |
| 2001/0037547 | A1 * | 11/2001 | Gruner | 29/263 |
| 2005/0132552 | A1 * | 6/2005 | Greenhill | 29/229 |
| 2006/0260111 | A1 * | 11/2006 | Russell | 29/426.4 |
| 2007/0124907 | A1 * | 6/2007 | Russegger et al. | 29/426.1 |
| 2009/0229103 | A1 * | 9/2009 | Alexander | 29/426.5 |
| 2009/0271929 | A1 * | 11/2009 | Adams et al. | 7/144 |
| 2010/0229363 | A1 * | 9/2010 | Morrison et al. | 29/426.6 |
| 2010/0269325 | A1 * | 10/2010 | Hassard | 29/453 |
| 2011/0030189 | A1 * | 2/2011 | Frias | 29/426.5 |
| 2011/0061217 | A1 * | 3/2011 | Shevela et al. | 29/235 |
| 2011/0138968 | A1 * | 6/2011 | Kubly | 81/45 |
| 2013/0031763 | A1 * | 2/2013 | Kliskey | 29/426.6 |

* cited by examiner

DIESEL FUEL INJECTOR CIRCLIP AND FERRULE RING REMOVING TOOL

CROSS REFERENCE TO PRIOR APPLICATIONS

This application claims the benefit from U.S. Provisional Application No. 61/312,189 filed on Mar. 9, 2010, which is hereby incorporated by reference for all purposes as if fully set forth herein.

FIELD OF THE DISCLOSURE

This disclosure is directed to a removal tool, and particularly to a tool for removing ferrule rings, circlips, and/or the like, from an apparatus, such as, for example, a control valve body of a fuel injector.

BACKGROUND OF THE DISCLOSURE

Fuel injectors, such as, e.g., diesel fuel injectors, typically have retaining components, such as, e.g., a circlip, a ferrule ring, and/or the like, to retain a sealing component, such as, e.g., a D-ring, in a control valve body (CVB). During the recycling/remanufacturing process of fuel injectors, those retaining components may need to be removed. However, different retaining components require different removal processes involving different removal tools, respectively. Accordingly, there is a need for simplifying shortening the retaining component removal process.

SUMMARY OF THE DISCLOSURE

According to an aspect of the disclosure, a removal tool includes a staking unit configured to deform a circlip located at a bore of an apparatus when the removal tool is pushed into the bore, and a spring fork unit configured to push a ferrule ring located at the bore when the removal tool is pushed into the bore.

The spring fork may be further configured to catch and remove the circlip and the ferrule ring from the bore when the removal tool is pulled from the bore. The staking unit may include a slot configured to receive the spring fork unit. The staking unit may include a handle, a neck, and a head.

The neck may include an upper portion that is connected to the handle and a lower portion that is connected to the head, and the lower portion may include a stake for deforming the circlip. The handle, the neck and the head may be substantially concentric. The handle may include a through hole. The handle and the head may have a substantially cylindrical shape.

The head may have a diameter that is smaller than a diameter of the lower portion of the neck or a diameter of the bore of the apparatus. The upper portion of the neck may have a diameter that is larger than a diameter of the handle. The diameter of the lower portion of neck may be smaller than a diameter of the upper portion of the neck.

The slot may include the first side slot extending vertically from the handle to the head via the neck, the second side slot located opposite to the first side slot and extending vertically from the handle to the head via the neck, and a top slot formed at the head and extending between top ends of the first side slot and the second side slot.

The staking unit may include a core portion extending from the handle to the head via the neck and exposed by the first side slot, the second side slot and the top slot. The core portion may include a tapered lower portion.

The spring fork unit may include first and second legs extending substantially in parallel and a link extending between top ends of the first and second legs. The first leg, the second leg and the link may be placeable in the first side slot, the second side slot and the top slot, respectively, when the spring fork unit is engaged to the staking unit.

The spring fork unit may further include the first engagement member extending outwardly from a lower end of the first leg, the first engagement member configured to catch and push the ferrule ring when the removal tool is pushed into the bore, and further configured to catch and pull the circlip when the removal tool is pulled from the bore. The spring fork unit may further include the second engagement member extending outwardly from the lower end of the first leg and configured to catch and pull the ferrule ring when the removal tool is pulled from the bore. The spring fork unit may further include the third engagement member extending outwardly from a lower end of the second leg and configured to catch and pull the ferrule ring when the removal tool is pulled from the bore.

The apparatus may be a control valve body. The apparatus may be a control valve body of a fuel injector.

According to another aspect of the disclosure, a method of removing components from a bore of an apparatus using a removal tool that includes a staking unit configured to deform a circlip located at the bore of the apparatus and a spring fork unit configured to push a ferrule ring located at the bore, the method may include pushing the removal tool into the bore of the apparatus to deform the circlip located at the bore and dislocate the ferrule ring located at the bore, and pulling the removal tool from the bore to remove the deformed circlip and the dislocated ferrule ring from the bore.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1A:
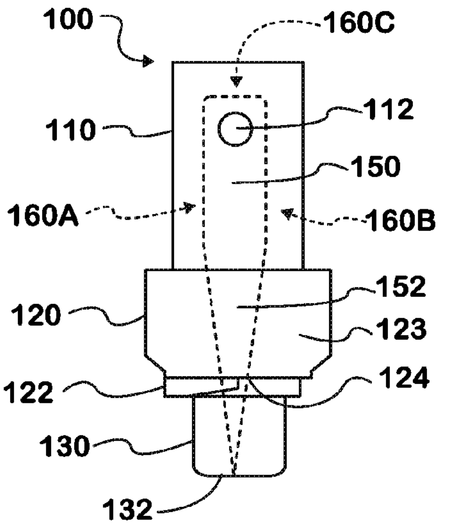
FIG. 1A shows a front view of a stake unit of a removable tool, constructed according to the principles of the disclosure.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Figure 1B:
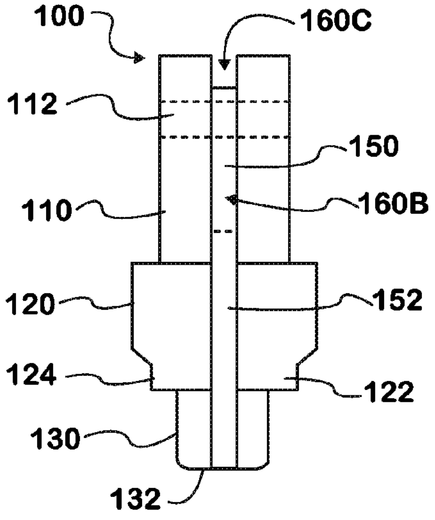
FIG. 1B shows a side view of the stake unit shown in FIG. 1A.

FIG. 1A shows a front view of an example of a stake unit 100 of a removable tool 10 (shown in FIG. 3) constructed according to the principles of the disclosure. The stake unit 100 is configured for removing ferrule rings, circlips and/or the like from a bore of an apparatus, such as, e.g., a control valve body (CVB) of a fuel injector or the like. FIG. 1B shows a side view of the stake unit 100 shown in FIG. 1A, and FIG. 1C shows a bottom view of the stake unit 100 shown in FIG. 1A.

Figure 1C:
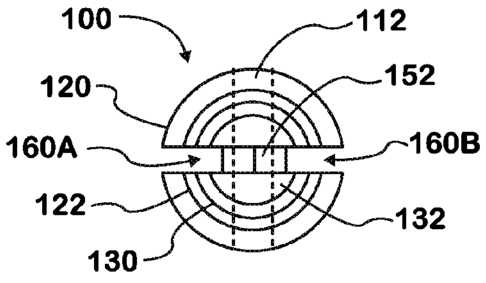
FIG. 1C shows a bottom view of the stake unit shown in FIG. 1A.

Referring to FIGS. 1A, 1B and 1C concurrently, the stake unit 100 may include a handle 110, a neck 120, and a head 130. The handle 110, neck 120 and head 130 may be substantially concentric. The handle 110 and the head 130 may have a substantially cylindrical shape. The neck 120 may also have a substantially cylindrical shape except for a lower portion thereof. More specifically, as shown in FIG. 1A, the neck 130 may be tapered at the lower portion such that a diameter of a bottom end portion 122 of the neck 120 may be smaller than that of an upper portion 123. Other shapes and configurations are also contemplated for the handle 110, neck 120 and head 130.

Figure 3:
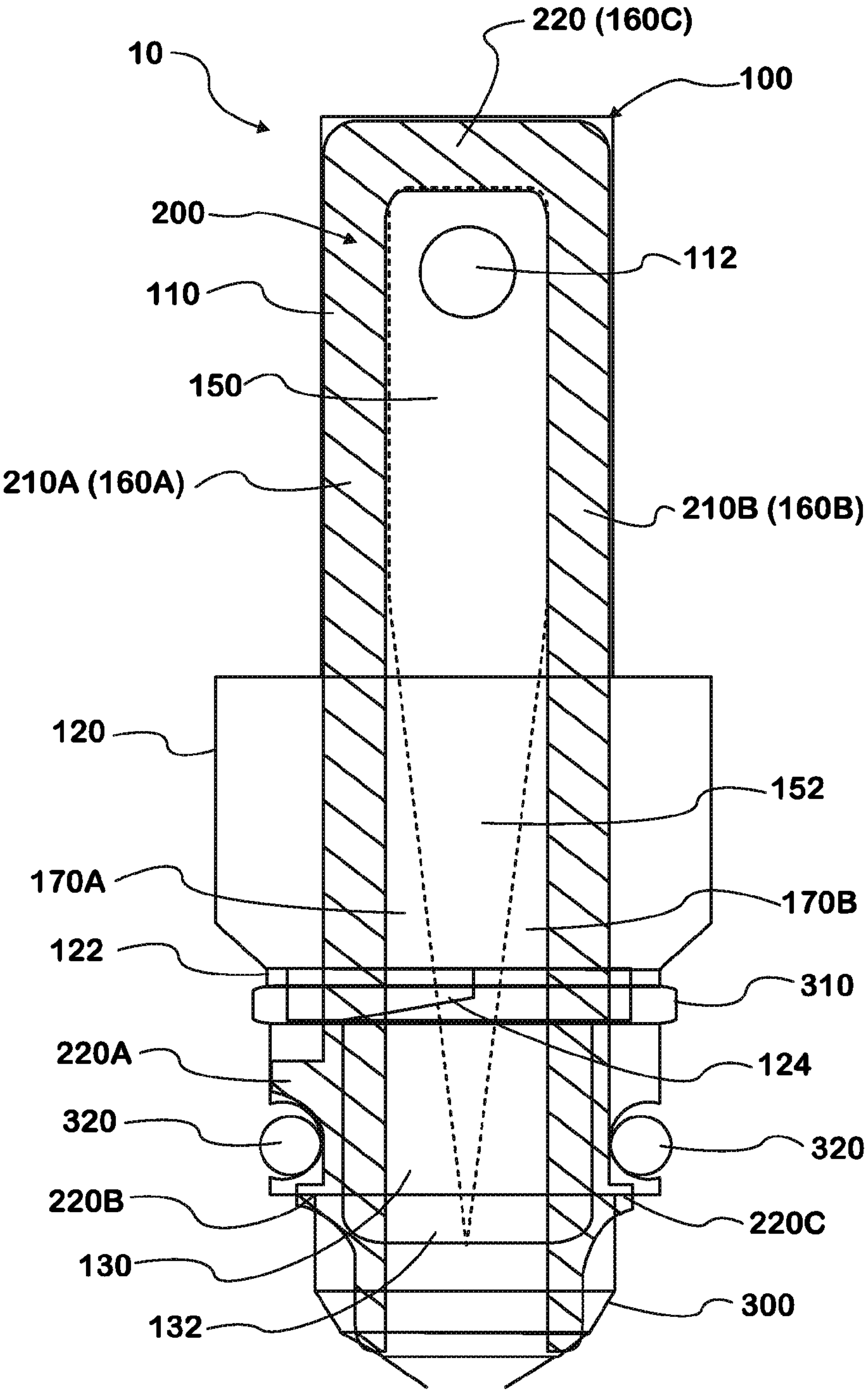
FIG. 3 shows the removal tool pushed into a bore of a control valve body.

The neck 120 may include a stake 124 to deform a circlip 310 (shown in FIG. 3), which may be affixed to a bore, such as, e.g., a control valve body (CVB) bore 300 (shown in FIG. 3), when the removal tool 10 is pushed into the CVB bore 300, an example of which is shown in FIG. 3. The stake 124 may be formed at the bottom end portion 122 of the neck 120. A diameter of the bottom end portion 122 may be substantially similar to or slightly smaller than the CVB bore 300, such that the stake 124 may be aligned with the circlip 310 when the removal tool 10 is inserted into the CVB bore 300. The handle 120 may include a through-hole 112. A diameter of the handle 110 may be smaller than that of the upper portion 123 of the neck 120. The head 130 may have a substantially flat bottom surface 132. A diameter of the head 120 may be smaller than that of the bottom end portion 122 of the neck 120 and the CVB bore 300.

The stake unit 100 may include a plurality of slots 160A, 160B, 160C (collectively referred to as slot 160), formed along the sides and top thereof. For example, the slot 160 may include side slots 160A, 160B formed on the sides of the stake unit 100 and a top slot 160C formed at the top of the stake unit 100. It is noted that the top slot 160C may be optional. The top slot 160C may extend horizontally between the upper ends of the side slots 160A, 160B. The side slots 160A, 160B may extend vertically from an uppermost end of the handle 110 to a lowermost end of the head 130. The slot 160 may expose a core portion 150 of the stake unit 100. As seen in FIGS. 1A and 1B, the core portion 150 may extend from the slot 160C in the handle 110 to the lowermost end of the head 130, including the neck 120. Where a slot 160C is not included, the core portion 150 may extend from the uppermost end of the handle 110 to the lowermost end of the neck 120.

As seen in FIG. 1C, the stake unit 100 may have a substantially symmetric configuration with respect to the side slots 160A, 160B and the core portion 150. The core portion 150 may have a tapered lower portion 152 such that the side slots 160A, 160B become gradually deeper as advancing downwardly. The through-hole 112 may extend through a width of the handle 110, including the core portion 150.

Figure 2:
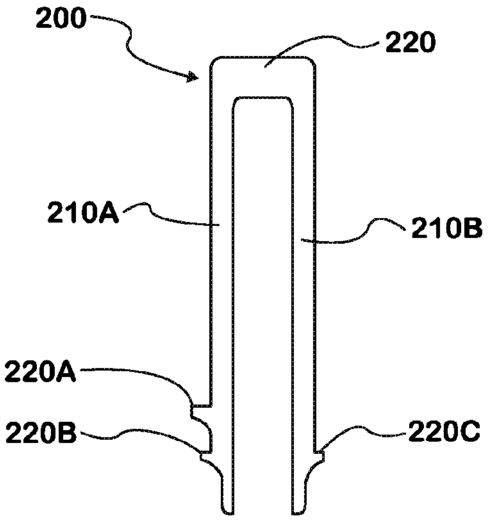
FIG. 2 shows a front view of a spring fork unit of the removable tool, constructed according to the principles of the disclosure.

FIG. 2 shows a front view of a spring fork unit 200 of the removable tool 10, constructed according to the principles of the disclosure. The spring fork unit 200 may include a first leg 210A, a second leg 210B, and a link 220. The first leg 210A, second leg 210B and link leg 220 may be formed substantially simultaneously as a single, integral structure, or from multiple components assembled into a unitary structure. The first and second legs 210A, 210B may extend vertically, substantially in parallel to each other. The link 220 may extend between the top ends of the first and second legs 210A, 210B, such that the lower portions of the first and second legs 210A, 210B may be bent inwardly towards each other. Other configurations are also contemplated for the spring fork unit 200.

The spring fork unit 200 may further include one or more engagement members 220, such as, e.g., an upper engagement member 220A, and a pair of lower engagement members 220B, 220C. The engagement members 220 may extend outwardly from the lower portion of the first and second legs 210A, 210B. The upper engagement member 220A may be configured to engage a ferrule ring 320 (shown in FIG. 3), or the like, which may be located at the CVB bore 300 when the removal tool 10 is inserted into the CVB bore 300. When a force is applied to push the removal tool 10 into the CVB bore 300, the upper engagement member 220A may engage and dislocate the ferrule ring 320, pushing the ferrule ring 320 downwardly. The upper engagement member 220A may be further configured to engage and deform the circlip 310 when the removal tool 10 is pulled from the CVB bore 300. Thus, when a force is applied to pull the removal tool 10 from the CVB bore 300, the upper engagement member 220A may catch the deformed circlip 310 and pull it out from the CVB bore 300. Although FIG. 2 shows the engagement member 220A extending from the first leg 210A, the engagement member 220A may extend from either or both of the first and second legs 210A, 210B.

The lower engagement members 220B, 220C may extend outwardly from the first and second legs 210A, 210B, respectively. Alternatively, only one of the lower engagement members 220B, 220C may be formed at one of the first and second legs 210A, 210B. The lower engagement members 220B, 220C may be shorter than the upper engagement member 220A to be easily inserted past the ferrule ring 320 and engage the ferrule ring 320 from below. When the removal tool 10 is pulled from the CVB bore 300, the lower engagement members 220B may catch the dislocated ferrule ring 320 and move it upwardly to remove the ferrule ring 320 from the CVB bore 300.

The spring fork unit 200 may be configured to fit within the slot 160 of the stake unit 100. For example, the spring fork unit 200 may be inserted into the slot 160 of the stake unit 100 downwardly from above, when the longitudinal axis of the stake unit 100 is substantially aligned with the direction of gravity. Upon being completely inserted into the slot 160, the spring fork unit 200 may substantially occupy the slot 160 of the stake unit 100. For example, the link 220 may occupy the top slot 160C, the first side leg 210A may occupy the side slot 160A and the second side leg 210B may occupy the side slot 160B. As seen in FIG. 1A, the core portion 150 may include the tapered lower portion 152. Thus, there may be gaps 170A, 170B (shown in FIG. 3) between the lower portions of the first and second side legs 210A, 210B and the tapered lower portion 152. The gaps 170A, 170B may allow the lower portions of the first and second side legs 210A, 210B to bend inward toward the tapered lower portion 152, such that the engagement members 220 may be easily inserted past the circlip 310, the ferrule ring 320, and/or the like, and placed at a desired location.

FIG. 3 shows an example of the removal tool 10, including the stake unit 100 and the spring fork unit 200 pushed into the CVB bore 300 to remove the circlip 310, the ferrule ring 320, and/or the like, therefrom. When a force is applied to push the removal tool 10 downwardly into the CVB bore 300, the stake 124 located at the bottom end portion 122 of the stake unit 100 may permanently deform the circlip 310 such that the circlip 310 may be easily removed from the CVB bore 300. Also, the upper engagement member 220A of the spring fork unit 200 may push down the ferrule ring 320 toward the bottom of the CVB bore 300. Thus, both the circlip 310 and the ferrule ring 320 may be substantially simultaneously dislocated from their respective original locations in the CVB bore 300 by a single downward movement. Alternatively, the circlip 310 and the ferrule ring 320 may be dislocated at different times, depending on the location of the engagement members 220A, 220B, 220C with respect to the positions of the circlip 310 and ferrule ring 330. The dislocated ferrule ring 320 may be caught from below by the second engagement members 220B, 220C. Thus, when a force is applied to pull the removal tool 10 from the CVB bore 300, the second engagement members 220B, 220C may catch and pull the dislocated ferrule ring 320 out from the CVB bore 300. The upper engagement member 220A may catch and pull the deformed circlip 310 from below when the removal tool 10 is pulled from the CVB bore 300. Thus, both the deformed circlip 310 and dislocated ferrule ring 320 may be removed substantially simultaneously from the CVB bore 300 by a single upward movement.

Accordingly, the removal tool 10 may quickly remove components, such as, e.g., the circlip 310, the ferrule ring 320 and/or the like, from the CVB bore 300 with a minimal effort. Thus, the process for removing the retaining components may be simplified and shortened using a single removal tool.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A removal tool comprising:

a staking unit configured to deform a circlip located at a bore of an apparatus when the removal tool is pushed into the bore;

a spring fork unit configured to push a ferrule ring located at the bore when the removal tool is pushed into the bore;

wherein the spring fork unit is further configured to catch and remove the circlip and the ferrule ring from the bore when the removal tool is pulled from the bore;

wherein the staking unit comprises a slot configured to receive the spring fork unit;

wherein the staking unit further comprises:

a handle;

a neck; and a head, wherein the neck includes an upper portion that is connected to the handle and a lower portion that is connected to the head, wherein said lower portion comprises a stake for deforming the circlip; and wherein the slot comprises:

a first side slot extending vertically from the handle to the head via the neck;

a second side slot located opposite to the first side slot and extending vertically from the handle to the head via the neck; and a top slot formed at the head and extending between top ends of the first side slot and the second side slot.

2. The removal tool of claim 1, wherein the handle, the neck and the head are substantially concentric.

3. The removal tool of claim 1, wherein the handle comprises a through hole.

4. The removal tool of claim 1, wherein the handle and the head have a substantially cylindrical shape.

5. The removal tool of claim 1, wherein the head has a diameter that is smaller than a diameter of the lower portion of the neck or a diameter of the bore of the apparatus.

6. The removal tool of claim 5, wherein the upper portion of the neck has a diameter that is larger than a diameter of the handle.

7. The removal tool of claim 5, wherein the diameter of the lower portion of neck is smaller than a diameter of the upper portion of the neck.

8. The removal tool of claim 1, wherein the staking unit comprises a core portion extending from the handle to the head via the neck and exposed by the first side slot, the second side slot and the top slot.

9. The removal tool of claim 8, wherein the core portion comprises a tapered lower portion.

10. The removal tool of claim 9, wherein the spring fork unit comprises:

first and second legs extending substantially in parallel; and a link extending between top ends of the first and second legs, wherein the first leg, the second leg and the link are placeable in the first side slot, the second side slot and the top slot, respectively, when the spring fork unit is engaged to the staking unit.

11. The removal tool of claim 10, wherein the spring fork unit further comprises a first engagement member extending outwardly from a lower end of the first leg, the first engagement member configured to catch and push the ferrule ring when the removal tool is pushed into the bore, and further configured to catch and pull the circlip when the removal tool is pulled from the bore.

12. The removal tool of claim 11, wherein the spring fork unit further comprises a second engagement member extending outwardly from the lower end of the first leg and configured to catch and pull the ferrule ring when the removal tool is pulled from the bore.

13. The removal tool of claim 12, wherein the spring fork unit further comprises a third engagement member extending outwardly from a lower end of the second leg and configured to catch and pull the ferrule ring when the removal tool is pulled from the bore.

14. The removal tool of claim 1, wherein the apparatus is a control valve body.

15. The removal tool of claim 1, wherein the apparatus is a control valve body of a fuel injector.

* * * * *